(12) United States Patent
Buerkle et al.

(10) Patent No.: US 12,504,768 B2
(45) Date of Patent: Dec. 23, 2025

(54) SYSTEM AND SAFETY GUIDE ROBOT FOR ACCESSING AUTOMATED ENVIRONMENTS

(71) Applicant: Intel Corporation, Santa Clara, CA (US)

(72) Inventors: Cornelius Buerkle, Karlsruhe (DE); Fabian Oboril, Karlsruhe (DE); Frederik Pasch, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 17/484,863

(22) Filed: Sep. 24, 2021

(65) Prior Publication Data

US 2022/0009103 A1    Jan. 13, 2022

(51) Int. Cl.
| | |
|---|---|
| *G05D 1/617* | (2024.01) |
| *G05D 1/00* | (2024.01) |
| *G05D 1/656* | (2024.01) |
| *G05D 105/30* | (2024.01) |
| *B25J 9/16* | (2006.01) |
| *B25J 11/00* | (2006.01) |
| *G05D 1/698* | (2024.01) |
| *G05D 107/70* | (2024.01) |

(52) U.S. Cl.
CPC ........... *G05D 1/617* (2024.01); *G05D 1/0214* (2013.01); *G05D 1/0289* (2013.01); *G05D 1/656* (2024.01); *B25J 9/1666* (2013.01); *B25J 9/1679* (2013.01); *B25J 11/0005* (2013.01); *B25J 11/008* (2013.01); *G05B 2219/40202* (2013.01); *G05D 1/6987* (2024.01); *G05D 2105/315* (2024.01); *G05D 2107/70* (2024.01)

(58) Field of Classification Search
CPC .... G05D 1/617; G05D 1/0214; G05D 1/0289; G05D 1/656; G05D 1/6987; G05D 2105/315; G05D 2107/70; G05D 2109/10; G05D 1/686; B25J 9/1666; B25J 9/1679; B25J 11/0005; B25J 11/008; G05B 2219/40202
See application file for complete search history.

(56) References Cited

U.S. PATENT DOCUMENTS

| | | | | |
|---|---|---|---|---|
| 10,233,021 | B1 * | 3/2019 | Brady | ................ G06Q 10/0832 |
| 2010/0324771 | A1 * | 12/2010 | Yabushita | .............. G05D 1/024 701/25 |

(Continued)

FOREIGN PATENT DOCUMENTS

KR    102245705 B1 *    4/2021    ............ B25J 13/025

OTHER PUBLICATIONS

Inoue, A., et al., "On-line Motion Planning of an Autonomous Mobile Robot to Avoid Multiple Moving Obstacles Based on the Prediction of Their Future Trajectories", Mar. 15, 1997, Journal of the Robotics Society of Japan, vol. 15 No. 2, pp. 249-260 (Year: 1997).*

(Continued)

*Primary Examiner* — Abby Lin
*Assistant Examiner* — Karston G. Evans
(74) *Attorney, Agent, or Firm* — Banner & Witcoff, Ltd.

(57) ABSTRACT

Techniques are disclosed to facilitate path planning safety guiding robots (SGR) for safely navigating and guiding humans through autonomous environments having other autonomous agents such as stationary and/or mobile robots.

22 Claims, 7 Drawing Sheets

(56) References Cited

U.S. PATENT DOCUMENTS

| | | |
|---|---|---|
| 2016/0250751 A1 | 9/2016 | Martinson et al. |
| 2018/0231974 A1* | 8/2018 | Eggert ................ B60W 30/085 |
| 2019/0369642 A1 | 12/2019 | Watabe et al. |
| 2020/0078943 A1* | 3/2020 | Song .................... G05D 1/0214 |
| 2020/0180861 A1* | 6/2020 | Fürstenberg ......... B65G 1/0492 |
| 2021/0402601 A1* | 12/2021 | Wang ................... G05D 1/0217 |
| 2022/0026914 A1* | 1/2022 | Kawai .................. G05D 1/0016 |
| 2022/0288778 A1* | 9/2022 | Østergaard ........... G05D 1/0246 |
| 2023/0096023 A1* | 3/2023 | Zucker .................. A61B 34/30 |
| | | 606/1 |
| 2024/0174203 A1* | 5/2024 | Wang ................ B60W 30/0956 |

OTHER PUBLICATIONS

Zhongyu, et al., "Toward a Ballbot for Physically Leading People: A Human-Centered Approach", 2019 IEEE/RSJ International Conference on INtelligent Robots and Systems (IROS), 7 pgs., Nov. 3, 2019.

Feb. 6, 2023 (EP) Search Report—App. 22195633.7.

\* cited by examiner

SYSTEM AND SAFETY GUIDE ROBOT FOR ACCESSING AUTOMATED ENVIRONMENTS

TECHNICAL FIELD

The disclosure described herein generally relate to access assistance for automated environments, including path planning and guided assistance by one or more autonomous agents.

BACKGROUND

Robotics and autonomous mobile platforms such as Autonomous Mobile Robots (AMRs) and/or Autonomous Guided Vehicles (AGVs) are key components in factories, warehouses, hospitals, and other industrial and/or commercial environments. Autonomous mobile platforms implement perception and manipulation jointly to accomplish a given task by navigating an environment. AMRs may communicate and coordinating with one other and/or with a central controller. Robotics and autonomous mobile platforms may create hazardous environments for humans and require extensive safety monitoring or isolation of humans from active autonomous environments.

BRIEF DESCRIPTION OF THE DRAWINGS/FIGURES

The accompanying drawings, which are incorporated herein and form a part of the specification, illustrate the present disclosure and, together with the description, and further serve to explain the principles of the disclosure and to enable a person skilled in the pertinent art to make and use the techniques discussed herein.

The present disclosure will be described with reference to the accompanying drawings. The drawing in which an element first appears is typically indicated by the leftmost digit(s) in the corresponding reference number.

DETAILED DESCRIPTION

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Robotics and autonomous environments require safety monitoring and/or isolation of humans from active autonomous environments to reduce or prevent potential harm to humans entering the environment and surrounding area of the robot within the environment. To reduce or prevent robot-human accidents, conventional systems have addressed shared environments and separate environment arrangements. In shared environments, the robots must be aware of humans in their surrounding and if there is a risk of collision, reduce speed or even stop operations. In addition, workers may be trained to respect robots working areas. As a consequence, the costs of the robots increase as there is the need for additional sensors for perception of humans, usually with special safety requirements that increase costs, and for additional safety functionality. Also untrained workers are generally not allowed to enter the working areas, or must be accompanied by a trained worker. In separate working area arrangements, the robot environment is separated from human environments to prevent robot-human interactions. While these arrangements may reduce the number of sensors and monitoring of the autonomous environment, all are generally required to be shut down when a human enters the autonomous environment.

Large warehouses or other sites are increasing working in full autonomy configurations without the presence of humans. In such cases, the number of sensors used to monitor the environment for humans to ensure human safety in the environment are reduced or the sensors are eliminating completely to reduce costs. However, these configurations require that the entire site or at least portions of the site need to be shut down when humans are present (e.g. for maintenance work), which reduces the efficiency of robots and the overall production of the facility.

Figure 1:
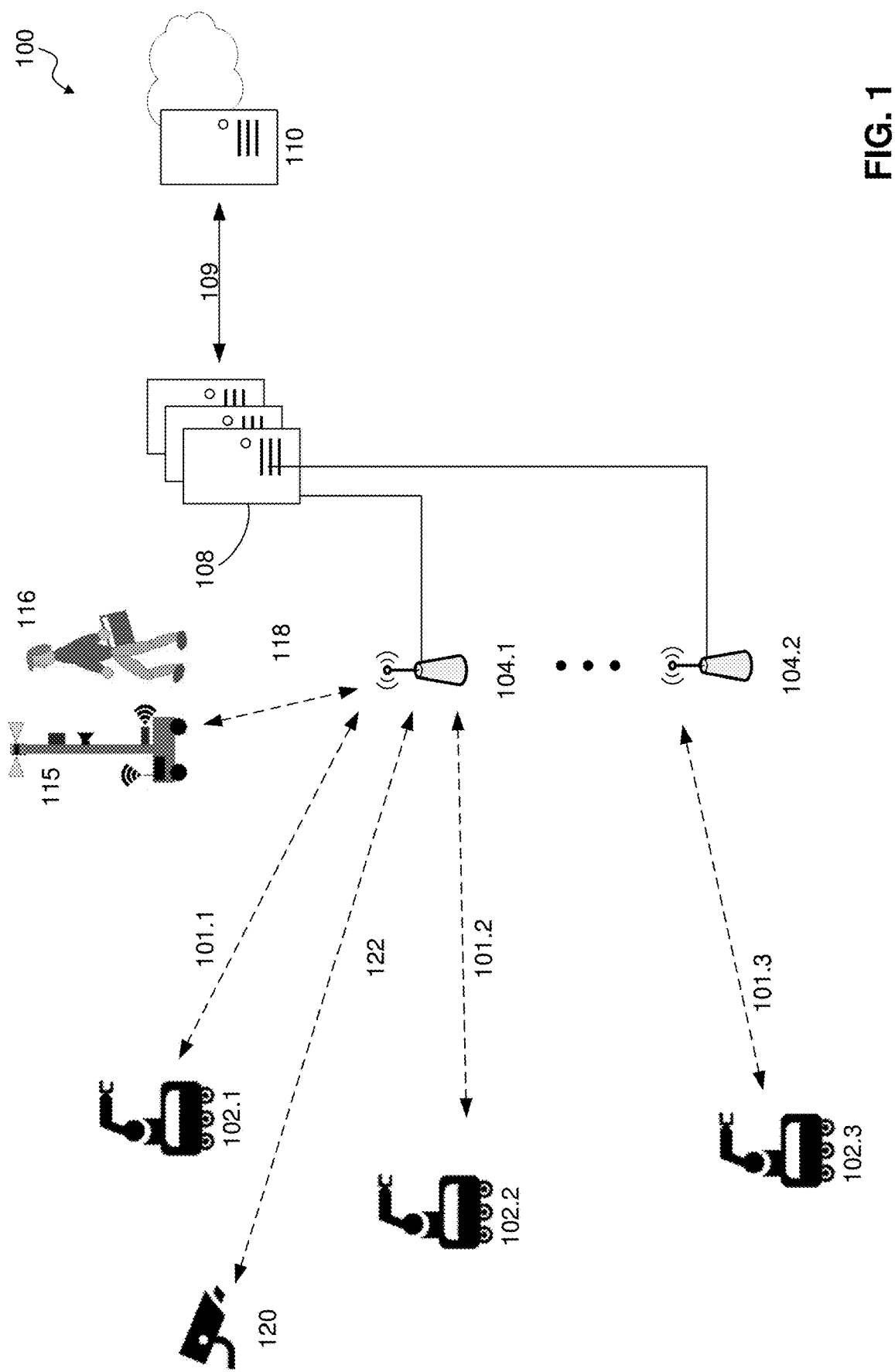
FIG. 1 illustrates a block diagram of an exemplary environment utilizing autonomous mobile robots (AMRs), in accordance with the disclosure.

The present disclosure provides an advantageous solution to address human interactions with autonomous agents (e.g. robots) in partial and full autonomous environments using one or more Safety Guide Robots (SGRs). FIG. 1 illustrates an exemplary environment 100 utilizing autonomous mobile robots (AMRs) 102 and the one or more Safety Guide Robots (SGRs) 115, in accordance with the disclosure. The SGR 115 is configured to accompany and guide one or more humans 116 safely through the environment 100 to a given destination. The SGR 115 may be equipped with one or more sensors to monitor the human(s) 115, localize itself in the environment 100, and communicate with the human(s) 115 and/or one or more other devices in the environment, such as one or more other SGRs 115 and/or AMR(s) 102. For example, upon a human entering the environment 100 (e.g. the facility with active AMRs), including a working area of an AMR 102, the SGR 115 may guide and/or restrict the movement of the human within the environment 100 and/or to enforce a speed reduction of the AMR(s) 102 an/or force one or more AMRs 102 to stop operating. The SGR 115 advantageously ensures safety of the human while reducing the impact to the continued operation of the AMRs 102 in the environment, including being able to finely tailor the control of the AMRs 102 that may encounter the human.

With continued reference to FIG. 1, the environment 100 supports any suitable number of AMRs 102, with three AMRs 102.1-102.3 being shown for ease of explanation, and any number of SGRs 115, with one SGR 115 being shown for easy of explanation. The environment 100 may include one or more sensors 120 configured to monitor the locations and activities of the SGRs 115, AMRs 102, and/or humans 116 within the environment 100. The sensors 120 may include, for example, radar, LIDAR, optical sensors, infrared sensors, cameras, or other sensors as would be understood by one or ordinary skill in the art. The sensors may communicate information (sensor data) with the computing device 108 (via access point(s) 104). Although not shown in FIG. 1 for purposes of brevity, the sensor(s) 120 may additionally communicate with one another and/or with one or more of the AMRs 102 and/or SGRs 115.

The environment 100 may be any suitable type of environment that uses the AMRs 102, such as a factory, warehouse, hospital, office building, etc. The AMRs 102 may have any suitable type of design and function to communicate with other components of a network infrastructure as further disused below. The AMRs 102 may operate autonomously or semi-autonomously and be configured as mobile robots that move within the environment 100 to complete specific tasks. One or more of the AMRs 102 may alternatively be configured as a stationary robots having moveable components (e.g. moveable arms) to complete localized tasks.

Figure 2:
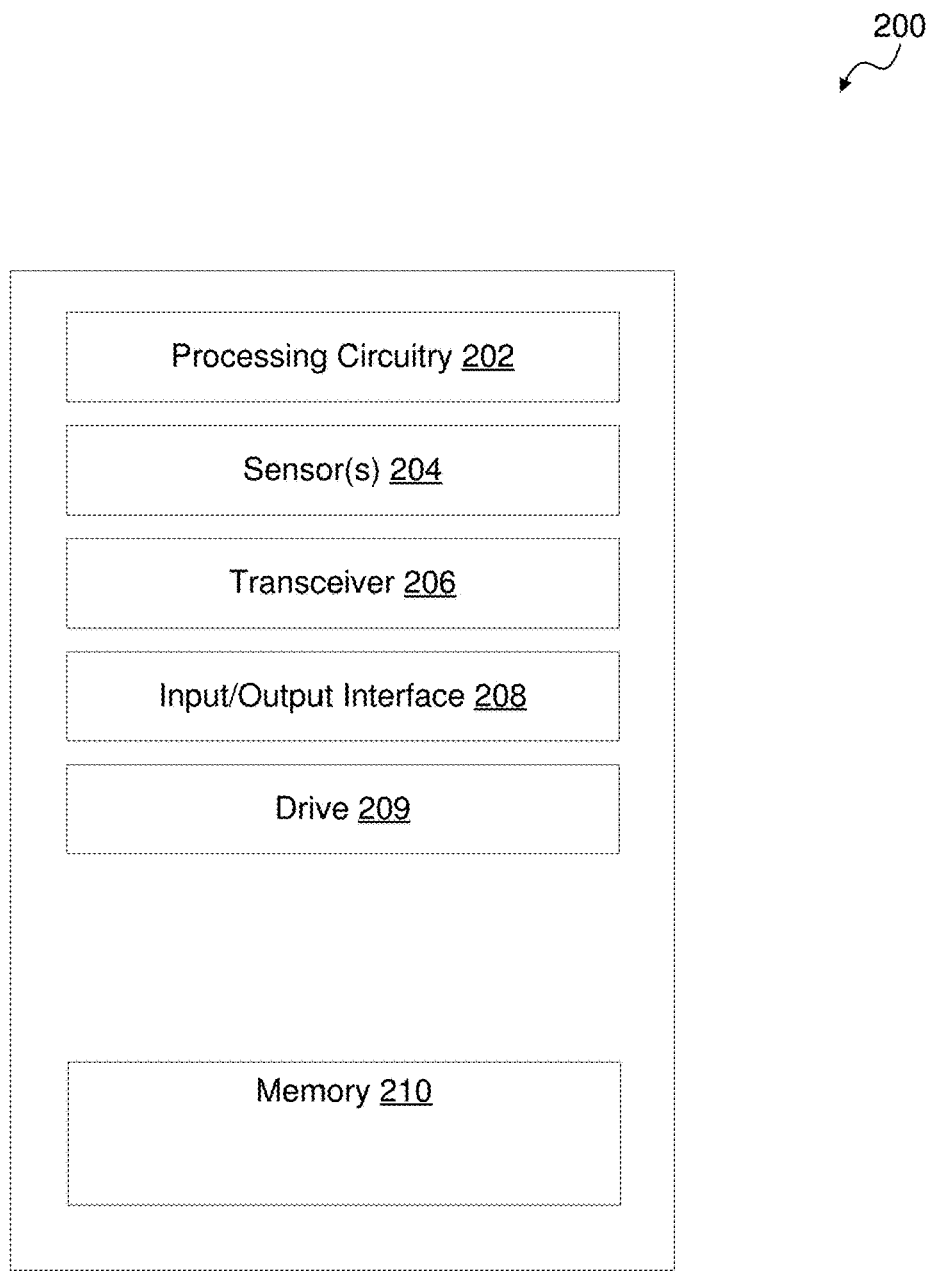
FIG. 2 illustrates a block diagram of an exemplary safety guide robot (SGR) in accordance with the disclosure.

The AMRs 102 may include any suitable number and/or type of sensors to enable sensing of their surroundings and the identification of feedback regarding the environment 100. The AMRs 102 may further be configured with any suitable number and/or type of wireless radio components to facilitate the transmission and/or reception of data. For example, the AMRs 102 may transmit data indicative of current tasks being executed, location, orientation, velocity, trajectory, heading, etc. within the environment 100 (via transceiver 206 as shown in FIG. 2). As another example, the AMRs 102 may receive commands and/or planned path information from the computing device 108, which each AMR 102 may execute to navigate to a specific location within the environment 100. Although not shown in FIG. 1 for purposes of brevity, the AMRs 102 may additionally communicate with one another to determine information (e.g. current tasks being executed, location, orientation, velocity, trajectory, heading, etc.) with respect to the other AMRs 102, as well as other information such as sensor data generated by other AMRs 102.

Figure 3:
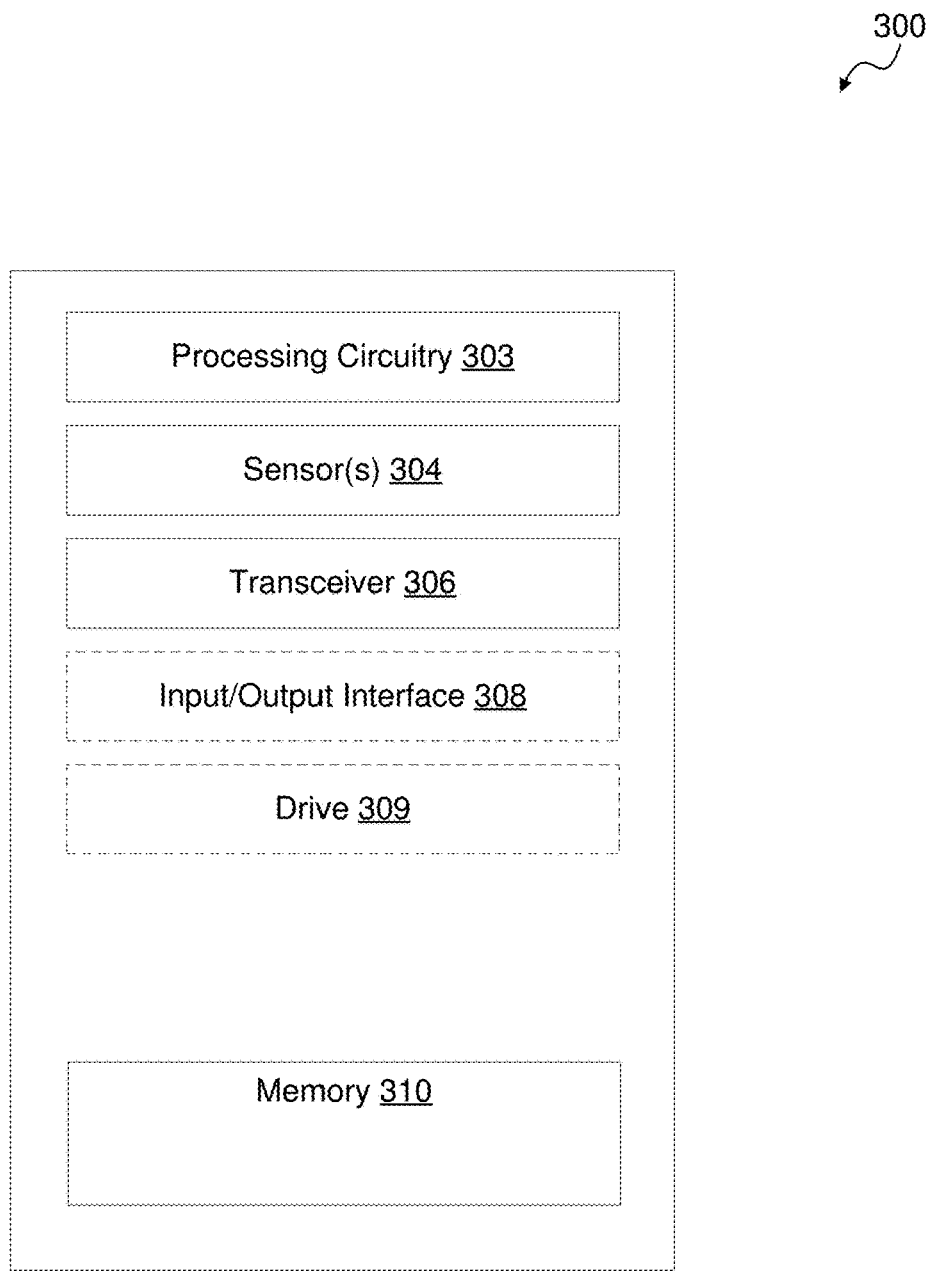
FIG. 3 illustrates a block diagram of an exemplary autonomous mobile robot (AMR) in accordance with the disclosure.

The SGR(s) 115 may include any suitable number and/or type of sensors to enable sensing of their surroundings and the identification of feedback regarding the environment 100. The SGR(s) 115 may further be configured with any suitable number and/or type of wireless radio components to facilitate the transmission and/or reception of data. For example, the SGR(s) 115 may transmit data indicative of current tasks being executed, location, orientation, velocity, trajectory, heading, etc. within the environment 100 (via transceiver 306 as shown in FIG. 3). As another example, the SGR(s) 115 may receive commands and/or planned path information from the computing device 108, which each SGR(s) 115 may execute to navigate to a specific location within the environment 100. Although not shown in FIG. 1 for purposes of brevity, the SGR(s) 115 may additionally communicate with one or more other SGRs 115 another to determine information (e.g. current tasks being executed, location, orientation, velocity, trajectory, heading, etc.) with respect to the other SGR(s) 115, as well as other information such as sensor data generated by other SGR(s) 115. The SGR(s) 115 may additionally include input/output (I/O) interfaces for communicating with the human(s) 115 and/or one or more transceivers for communicating with other devices in the environment, such as one or more other SGRs 115 and/or AMR(s) 102. The I/O interfaces may include microphone(s), speaker(s), display(s), image projector(s), light(s), laser(s), or other interfaces as would be understood by one of ordinary skill in the arts.

Although the disclosure includes examples of the environment 100 being a factory or warehouse that supports AMRs 102 operating within such an environment, this is by way of example and not limitation. The teachings of the disclosure may implemented in accordance with any suitable type of environment and/or type of mobile agent. For instance, the environment 100 may be outdoors and be identified with a region such as a roadway that is utilized by autonomous vehicles. Thus, the teachings of the disclosure are applicable to AMRs as well as other types of autonomous agents that may operate in any suitable type of environment based upon any suitable application or desired function.

The AMRs 102 and SGRs 115 operate within the environment 100 by communicating with the various components of the supporting network infrastructure. The network infrastructure may include any suitable number and/or type of components to support communications with the AMRs 102 and SGRs 115. For example, the network infrastructure may include any suitable combination of wired and/or wireless networking components that operate in accordance with any suitable number and/or type of communication protocols. For instance, the network infrastructure may include interconnections using wired links such as Ethernet or optical links, as well as wireless links such as Wi-Fi (e.g. 802.11 protocols) and cellular links (e.g. 3GPP standard protocols, LTE, 5G, etc.). The network infrastructure may be, for example, an access network, an edge network, a mobile edge computing (MEC) network, etc. In the example shown in FIG. 1, the network infrastructure includes one or more cloud servers 110 that enable a connection to the Internet, which may be implemented as any suitable number and/or type of cloud computing devices. The network infrastructure may additionally include a computing device 108, which may be implemented as any suitable number and/or type of computing device such as a server. The computing device 108 may be implemented as an Edge server and/or Edge computing device.

According to the disclosure, the computing device 108 may communicate with the one or more cloud servers 110 via one or more links 109, which may represent an aggregation of any suitable number and/or type of wired and/or wireless links as well as other network infrastructure components that are not shown in FIG. 1 for purposes of brevity. For instance, the link 109 may represent additional cellular network towers (e.g. one or more base stations, eNode Bs, relays, macrocells, femtocells, etc.). According to the disclosure, the network infrastructure may further include one or more access points (APs) 104. The APs 104 which may be implemented in accordance with any suitable number and/or type of AP configured to facilitate communications in accordance with any suitable type of communication protocols. The APs 104 may be configured to support communications in accordance with any suitable number and/or type of communication protocols, such as an Institute of Electrical and Electronics Engineers (IEEE) 802.11 Working Group Standards. Alternatively, the APs 104 may operate in accordance with other types of communication standards other than the 802.11 Working Group, such as cellular based standards (e.g. "private cellular networks") or other local wireless network systems, for instance. Additionally or alternatively, the AMRs 102 and/or SGR(s) 115 may communicate directly with the computing device 108 or other suitable components of the network infrastructure without the need to use the APs 104. Additionally or alternatively, one or more of AMRs 102 may communicate directly with one or more other AMRs 102 and/or with the SGRs 115. Similarly, one or more of SGRs 115 may communicate directly with one or more other SGRs 115 and/or with one or more of the AMRs 102.

In the environment 100 as shown in FIG. 1, the computing device 108 is configured to communicate with each of the AMRs 102 and/or SGRs 115 to receive data from the AMRs 102 and/or SGRs 115, respectively, and to transmit data to the AMRs 102 and/or SGRs 115, respectively. This functionality may be additionally or alternatively be performed by other network infrastructure components that are capable of communicating directly or indirectly with the AMRs 102 and/or SGRs 115, such as the one or more cloud servers 110, for instance. However, the local nature of the computing device 108 may provide additional advantages in that the communication between the computing device 108 and the AMRs 102 and/or SGRs 115 may occur with reduced network latency. Thus, according to the disclosure, the computing device 108 is used as the primary example when describing this functionality, although it is understood that this is by way of example and not limitation.

The computing device 108 may thus receive sensor data from each for the AMRs 102 and/or SGRs 115 via the APs 104 and use the respective sensor data, together with other information about the environment 100 that is already known (e.g. data regarding the size and location of static objects in the environment 100), to generate a shared environment model that represents the environment 100. This shared environment model may be represented as a navigation grid having cells of any suitable size and/or shape, with each cell having specific properties with respect to the type of object contained (or not contained) in the cell, whether an object in the cell is static or moving, etc., which enables the environment model to accurately depict the nature of the environment 100. As an example, grid cells may be squares of predetermined sizes (e.g. 80 mm) based upon a desired granularity for a particular environment and accompanying application. The environment model may thus be dynamically updated by the SGRs 115 and/or AMRs 102 directly and/or via the computing device 108 on a cell-by-cell basis as new sensor data is received from the SGRs 115 and/or AMRs 102. The updates to the shared environment model thus reflect any recent changes in the environment 100 such as the position and orientation of each of the SGRs 115 and/or AMRs 102 and other obstacles that may change in a dynamic manner within the environment 100 (e.g. people, forklifts, machinery, etc.). The shared environment model may additionally or alternatively be updated based upon data received from other sensors 120 or devices within the environment 100, such as stationary cameras for example, which may enable a more accurate depiction of the positions of the SGRs 115 and/or AMRs 102 without relying of SGR and/or AMR communications.

Each SGR 115 (and/or AMR 102 when configured as mobile robots) executes a path planning algorithm and uses the shared environment model at a particular time (e.g. the most recently constructed) to calculate navigational paths for each SGRs 115 and/or AMR 102. These navigational paths include sets of intermediate points ("waypoints") or nodes that define an SGR and/or AMR trajectory within the environment 100 between a starting point (e.g. its current location in the environment 100) to a destination (goal point) within the environment 100. That is, the waypoints indicate to the SGRs 115 and/or AMRs 102 how to execute a respective planned navigational path to proceed to each of the intermediate points at a specific time until a destination is reached.

The computing device (controller) 108 may alternatively or additionally (potentially in collaboration with one or more of the SGRs 115 and/or AMRs 102) calculate navigational paths for one or more of the SGRs 115 and/or AMRs 102. Alternatively or additionally, the cloud server(s) 110 may be configured to calculate navigational paths for one or more of the SGRs 115 and/or AMRs 102, which may then be transmitted to the SGRs 115 and/or AMRs 102, respectively. It should be appreciated that any combination of the SGRs 115, AMRs 102, computing device 108, and cloud server(s) 110 may calculate the navigational paths. The SGRs 115, AMRs 102, computing device 108, and/or cloud server(s) 110 may include processing circuitry that is configured to perform the respective functions of the SGRs 115, AMRs 102, computing device 108, and/or cloud server(s) 110, respectively. One or more of these devices may further be implemented with machine-learning capabilities.

Information dynamically discovered by the SGRs 115 and/or AMRs 102 may be, for instance, a result of each SGRs 115 and/or AMR 102 locally processing its respective sensor data. The updated shared environment model may be maintained by the central controller (computing device 108) and shared with each of the SGRs 115 and/or AMRs 102 as well being used for planning tasks. Thus, at any given point in time, the SGRs 115 and/or AMRs 102 may be attempting to determine which cells to add to a particular route (e.g. a planned path) or move to so that the assigned tasks of the SGRs 115 and/or the assigned tasks of the AMRs 102 may be accomplished in the most efficient manner. In other words, because of the dynamic nature of the environment 100, each SGRs 115 and/or AMR 102 may calculate its own respective navigation path in a continuous and iterative manner using iterative updates that are provided to the shared environment model. Thus, the shared environment model may be stored in the computing device 108 and/or locally in a memory associated with or otherwise accessed by each one of the SGRs 115 and/or AMRs 102. Additionally or alternatively, the shared environment model may be stored in any other suitable components of the network infrastructure or devices connected thereto. In any event, the SGRs 115 and/or AMRs 102 may iteratively receive or otherwise access the shared environment model, including the most recent updates, to perform navigation path planning functions as discussed herein. The shared environment model may thus be updated as new sensor data is received by the central controller (computing device 108) and processed, and/or processed locally by the SGRs 115 and/or AMRs 102, and be performed in a periodic manner or in accordance with any suitable schedule.

With reference to FIG. 2, the SGRs 115 may implement a suite of onboard sensors 204 to generate sensor data indicative of the location, position, velocity, heading orientation, etc. of the SGRs 115 within the environment 100 and/or the location, position, velocity, heading orientation, etc. of one or more humans 116 guided by the respective SGR 115. These sensors 204 may be implemented as any suitable number and/or type that are generally known and/or used for autonomous navigation and environmental monitoring. Examples of such sensors may include radar, LIDAR, optical sensors, cameras, compasses, gyroscopes, positioning systems for localization, accelerometers, etc. Thus, the sensor data may indicate the presence of and/or range to various objects near each SGR 115. Each SGRs 115 may additionally process this sensor data to identify obstacles, track the movement of the human(s) 116 to be guided, and/or other relevant information within the environment 100 that will impact the shared environment model. The SGRs 115 may then use the shared environment model to iteratively calculate respective navigation paths, as further discussed herein. According to the disclosure, the SGR 115 may be provided with an original path to the desired location in which the human 116 intends to or is expected to traverse. Additionally or alternatively, the SGR 115 has knowledge of the intended task to be performed by the human 116. The SGR 115 may receive this path and/or task information from the controller 108 and/or such information may be preloaded in the memory 210. When the SGR 115 is aware of the intended task to be performed but is unaware of the intended path (or is only partially aware of the intended path), the processing circuitry 202 is configured to plan an appropriate path to the location for the intended task.

The SGR 115 may be configured to operate in a guidance mode where the SGR 115 guides a complying human 116 to the planned destination. If the human 116 diverts from the planned path, the SGR 115 may operate in a tracking mode where the SGR 115 tracks and follows the human 116 if the human 116 diverts form the planned route. While tracking, the SGR 115 may provide continued notifications of safe regions on the diverted path, warning of hazardous regions along the diverted path, and/or to instruct AMRs 102 to stop operations or reduce operational speed/movement that the human 116 encounters or approaches along the diverted path.

The SGRs 115 102 may also any suitable number and/or type of hardware and software configuration to facilitate autonomous navigation functions within the environment 100, including known configurations. For example, each SGR 115 may implement a controller that may comprise one or more processors or processing circuitry 202, which may execute software that is installed on a local memory 210 to perform various autonomous navigation-related functions.

The SGR 115 may use onboard sensors 204 to perform pose estimation and/or to identify e.g. a position, orientation, velocity, direction, and/or location of the SGR 115 within the environment 100 as the SGR 115 moves along a particular planned path. The processing circuitry 202 can execute a path planning algorithm stored in memory 210 to execute path planning for navigation-related functions (e.g. SLAM, octomap generation, multi-robot path planning, etc.) of the SGR 115.

SGR Design and Configuration

Figure 5:
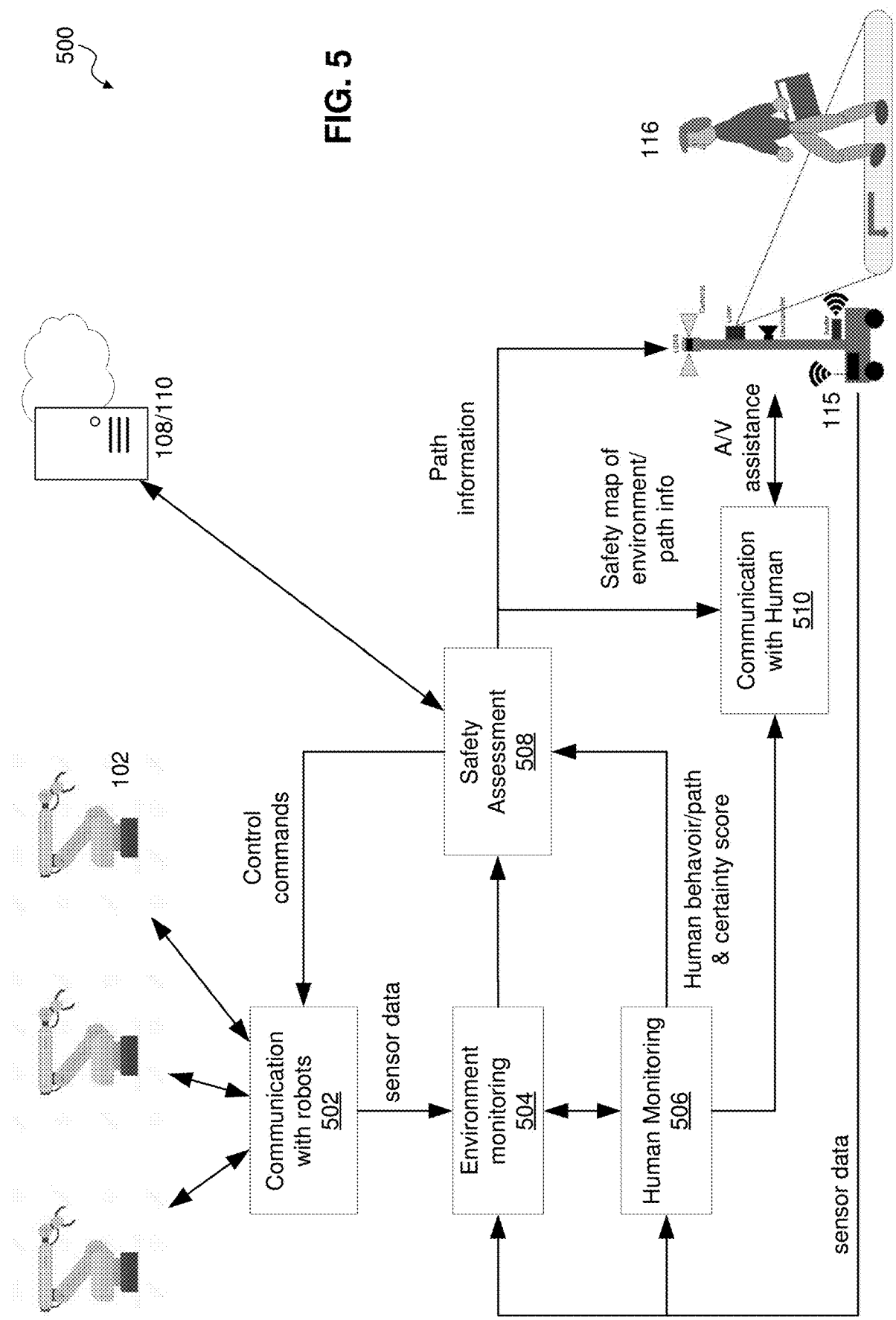
FIG. 5 illustrates a block diagram of an exemplary SGR system and operational flow in accordance with the disclosure.
Figure 6:
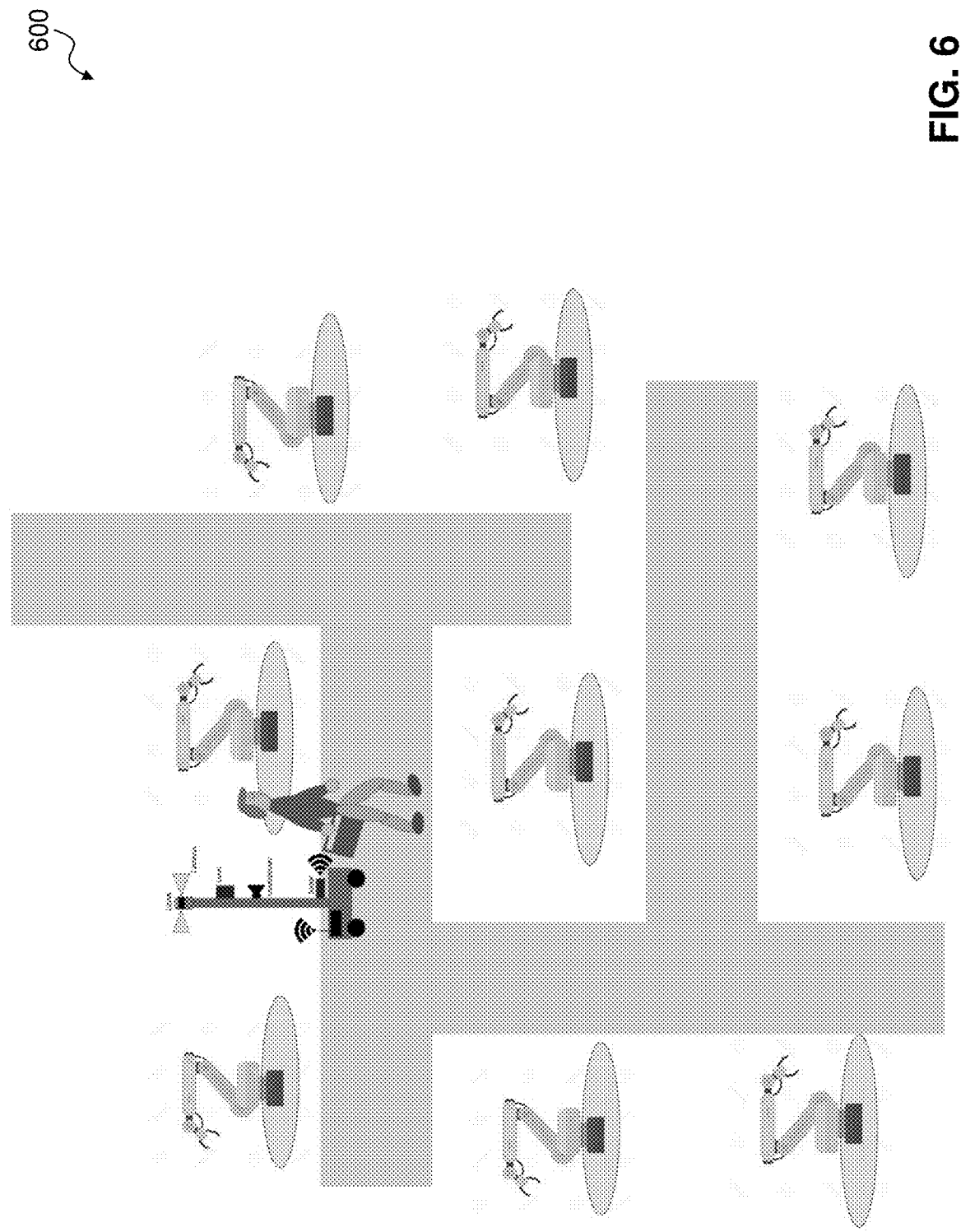
FIG. 6 illustrates a block diagram of an exemplary environment model in accordance with the disclosure.
Figure 7:
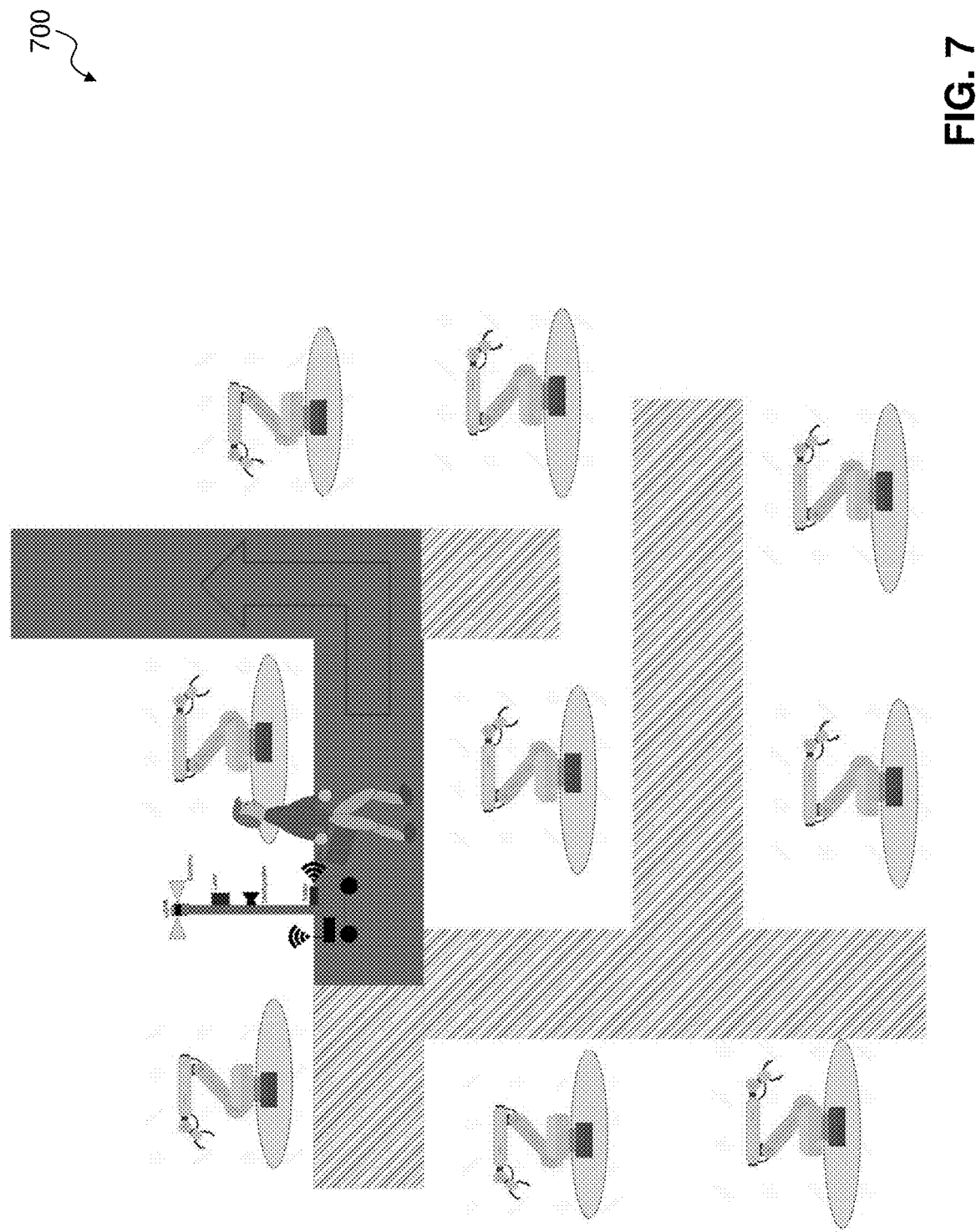
FIG. 7 illustrates illustrate safe and unsafe regions in the environment model in accordance with the disclosure.

FIG. 2 illustrates a block diagram of an exemplary autonomous agent, in accordance with the disclosure. The autonomous agent 200 as shown and described with respect to FIG. 2 may be identified with the SGR 115 as shown in FIG. 1 and discussed herein, for instance. The autonomous agent 200 may include processing circuitry 202, one or more sensors 204, a transceiver 206, input/output (I/O) interface 208, drive 209, and a memory 210. The components shown in FIG. 2 are provided for ease of explanation, and the autonomous agent 200 may implement additional, less, or alternative components as those shown in FIG. 2. The operation of the autonomous agent 200 is described below with additional references to FIGS. 5-7. FIG. 5 illustrates processing operations of the autonomous agent 200 (e.g. by the processing circuitry 202). FIG. 6 illustrates an example of the environment model according to the disclosure. FIG. 7 illustrate safe (green) and unsafe (red) regions in the environment model.

The sensors 204 may be implemented as any suitable number and/or type of sensors that may be used for autonomous navigation and environmental monitoring, including tracking of the human 116 that is being guided by the autonomous agent 200. Examples of such sensors may include radar, LIDAR, optical sensors, cameras, compasses, gyroscopes, positioning systems for localization, accelerometers, etc.

The processing circuitry 202 may be configured as any suitable number and/or type of computer processors, which may function to control the autonomous agent 200 and/or other components of the autonomous agent 200. The processing circuitry 202 may be identified with one or more processors (or suitable portions thereof) implemented by the autonomous agent 200.

The processing circuitry 202 may be configured to carry out instructions to perform arithmetical, logical, and/or input/output (I/O) operations, and/or to control the operation of one or more components of autonomous agent 200 to perform various functions associated with the disclosure as described herein. For example, the processing circuitry 202 may include one or more microprocessor cores, memory registers, buffers, clocks, etc., and may generate electronic control signals associated with the components of the autonomous agent 200 to control and/or modify the operation of these components. For example, the processing circuitry 202 may control functions associated with the sensors 204, the transceiver 206, I/O interface 208, drive 209, and/or the memory 210. The processing circuitry 202 may additionally perform various operations to control the movement, speed, and/or tasks executed by the autonomous agent 200, which may be based upon global and/or local path planning algorithms, as discussed herein.

The processing circuitry 202 may process an environment model generated by the controller 108 and received by the SGR 115 to perform autonomous navigation. This environment model may be represented as a navigation grid having cells of any suitable size and/or shape, with each cell having specific properties with respect to the type of object contained (or not contained) in the cell, whether an object in the cell is static or moving, etc., which enables the environment model to accurately depict the nature of the environment 100.

The processing circuitry 202 may use sensor data from one or more of its sensors 204, sensor data and/or other data from one or more of the AMRs 102, data from the controller 108, and/or other data as would be understood by one of ordinary skill in the art (e.g. commands or other data from an operator of the system) to dynamically update the environment model to iteratively calculate the navigation path of the SGR 115. For example, the processing circuitry 202 may process the sensor data to identify obstacles, track the movement of the human(s) 116 to be guided, and/or other relevant information within the environment 100 that will impact the shared environment model. The SGRs 115 may then use the shared environment model to iteratively calculate respective navigation paths. According to the disclosure, the processing circuitry 202 may execute a path planning algorithm (e.g. stored in memory 210) to perform autonomous navigation using the environment model and sensor data from one or more of its sensors 204, sensor data and/or other data from one or more of the AMRs 102, data from the controller 108, and/or other data as would be understood by one of ordinary skill in the art. The algorithm may be performed iteratively via the processing circuitry 202 to dynamically update the environment model. The updated environment model may be provided to one or more other SGRs 115, one or more of the AMRs 102, and/or to the controller 108.

The controller 108 may alternatively, or in conjunction with the SGR 115, be configured to dynamically update the environment model based on sensor and/or other data from the SGR 115, sensor and/or other data from one or more AMRs 102, and/or other data as would be understood by one of ordinary skill in the art, and then provide the updated environment model to the SGRs 115 and/or AMRs 102.

The transceiver 206 may be implemented as any suitable number and/or type of components configured to transmit and/or receive data packets and/or wireless signals in accordance with any suitable number and/or type of communication protocols. The transceiver 206 may include any suitable type of components to facilitate this functionality, including components associated with known transceiver, transmitter, and/or receiver operation, configurations, and implementations. Although depicted in FIG. 2 as a transceiver, the transceiver 206 may include any suitable number of transmitters, receivers, or combinations of these that may be integrated into a single transceiver or as multiple transceivers or transceiver modules. For example, the transceiver 206 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. The transceiver 206 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

I/O interface 208 may be implemented as any suitable number and/or type of components configured to communicate with the human(s) 115. The I/O interface 208 may include microphone(s), speaker(s), display(s), image projector(s), light(s), laser(s), and/or other interfaces as would be understood by one of ordinary skill in the arts. The I/O interface 208 may be configured to provide instructions to the human 115 to guide the human 115 along a designated path (FIGS. 6 and 7), such as by projecting path guides (e.g. colored path markers, arrows, or the like) on the ground to convey the appropriate areas in which the human 115 is to traverse. As shown in FIG. 7, the SGR 115 has identified a safe path (green) with an arrow to guide the human 116 on the suggested path determined by the SGR 115 and/or controller 108. The green path indicator and/or the arrow may be projected onto the ground to notify the human 116 of the path and/or the SGR 115 may communicate with the human 115 using one or more other I/O interfaces 208 (e.g. audio commands via a speaker).

The drive 209 may be implemented as any suitable number and/or type of components configured to drive the autonomous agent 200, such as a motor or other driving mechanism. The processing circuitry 202 may be configured to control the drive 209 to move the autonomous agent 200 in a desired direction and at a desired velocity.

The memory 210 stores data and/or instructions such that, when the instructions are executed by the processing circuitry 202, cause the autonomous agent 200 to perform various functions as described herein. The memory 210 may be implemented as any well-known volatile and/or non-volatile memory. The memory 210 may be implemented as a non-transitory computer readable medium storing one or more executable instructions such as, for example, logic, algorithms, code, etc. The instructions, logic, code, etc., stored in the memory 210 may enable the features disclosed herein to be functionally realized. For example, the memory 210 may include the path planning algorithm. For hardware implementations, the memory 210 may include instructions and/or code to facilitate control and/or monitor the operation of such hardware components. The disclosure may include the processing circuitry 202 executing the instructions stored in the memory 210 in conjunction with one or more hardware components to perform the various functions described herein.

With reference to FIG. 3, the AMRs 102 may implement a suite of onboard sensors 304 to generate sensor data indicative of the location, position, velocity, heading orientation, etc. of the AMR 102 within the environment 100. These sensors 304 may be implemented as any suitable number and/or type that are generally known and/or used for autonomous navigation and environmental monitoring. Examples of such sensors may include radar, LIDAR, optical sensors, cameras, compasses, gyroscopes, positioning systems for localization, accelerometers, etc. Thus, the sensor data may indicate the presence of and/or range to various objects near each AMR 102. Each AMR 102 may additionally process this sensor data to identify obstacles or other relevant information within the environment 100 that will impact the shared environment model. The AMRs 102 may then use the shared environment model to iteratively calculate respective navigation paths, as further discussed herein. The AMRs 102 may also any suitable number and/or type of hardware and software configuration to facilitate autonomous navigation functions within the environment 100, including known configurations. For example, each AMR 102 may implement a controller that may comprise one or more processors or processing circuitry 302, which may execute software that is installed on a local memory 310 to perform various autonomous navigation-related functions.

The AMR 102 may use onboard sensors 304 to perform pose estimation and/or to identify e.g. a position, orientation, velocity, direction, and/or location of the AMR 102 within the environment 100 as the AMR 102 moves along a particular planned path. The processing circuitry 302 can execute a path planning algorithm stored in memory 310 to execute path planning and sampling functionalities for navigation-related functions (e.g. SLAM, octomap generation, multi-robot path planning, etc.) of the AMR 102.

AMR Design and Configuration

FIG. 3 illustrates a block diagram of an exemplary autonomous agent 300, in accordance with the disclosure. The autonomous agent 300 as shown and described with respect to FIG. 3 may be identified with one or more of the AMRs 102 as shown in FIG. 1 and discussed herein, and is similar to the autonomous agent 200 shown in FIG. 2. The autonomous agent 300 may include processing circuitry 302, one or more sensors 304, a transceiver 306, and a memory 310. The autonomous agent 300 may additionally include input/output (I/O) interface 308 and/or drive 309 (e.g. when the agent 300 is a mobile agent). The components shown in FIG. 3 are provided for ease of explanation, and the autonomous agent 300 may implement additional, less, or alternative components as those shown in FIG. 3.

The processing circuitry 302 may be configured as any suitable number and/or type of computer processors, which may function to control the autonomous agent 300 and/or other components of the autonomous agent 300. The processing circuitry 302 may be identified with one or more processors (or suitable portions thereof) implemented by the autonomous agent 300. The processing circuitry 302 may be configured to carry out instructions to perform arithmetical, logical, and/or input/output (I/O) operations, and/or to control the operation of one or more components of autonomous agent 300 to perform various functions associated with the disclosure as described herein. For example, the processing circuitry 302 may include one or more microprocessor cores, memory registers, buffers, clocks, etc., and may generate electronic control signals associated with the components of the autonomous agent 300 to control and/or modify the operation of these components. For example, the processing circuitry 302 may control functions associated with the sensors 304, the transceiver 306, interface 308, drive 309, and/or the memory 310. The processing circuitry 302 may additionally perform various operations to control the movement, speed, and/or tasks executed by the autonomous agent 300, which may be based upon global and/or local path planning algorithms, as discussed herein.

The sensors 304 may be implemented as any suitable number and/or type of sensors that may be used for autonomous navigation and environmental monitoring. Examples of such sensors may include radar, LIDAR, optical sensors, cameras, compasses, gyroscopes, positioning systems for localization, accelerometers, etc.

The transceiver 306 may be implemented as any suitable number and/or type of components configured to transmit and/or receive data packets and/or wireless signals in accordance with any suitable number and/or type of communication protocols. The transceiver 306 may include any suitable type of components to facilitate this functionality, including components associated with known transceiver, transmitter, and/or receiver operation, configurations, and implementations. Although depicted in FIG. 3 as a transceiver, the transceiver 306 may include any suitable number of transmitters, receivers, or combinations of these that may be integrated into a single transceiver or as multiple transceivers or transceiver modules. For example, the transceiver 306 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. The transceiver 306 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

I/O interface 308 may be implemented as any suitable number and/or type of components configured to communicate with the human(s) 115. The I/O interface 308 may include microphone(s), speaker(s), display(s), image projector(s), light(s), laser(s), and/or other interfaces as would be understood by one of ordinary skill in the arts.

The drive 309 may be implemented as any suitable number and/or type of components configured to drive the autonomous agent 300, such as a motor or other driving mechanism. The processing circuitry 302 may be configured to control the drive 309 to move the autonomous agent 300 in a desired direction and at a desired velocity.

The memory 310 stores data and/or instructions such that, when the instructions are executed by the processing circuitry 302, cause the autonomous agent 300 to perform various functions as described herein. The memory 310 may be implemented as any well-known volatile and/or non-volatile memory. The memory 310 may be implemented as a non-transitory computer readable medium storing one or more executable instructions such as, for example, logic, algorithms, code, etc. The instructions, logic, code, etc., stored in the memory 310 may enable the features disclosed herein to be functionally realized. For hardware implementations, the modules shown in FIG. 3 associated with the memory 310 may include instructions and/or code to facilitate control and/or monitor the operation of such hardware components.

Computing Device (Controller) Design and Configuration

Figure 4:
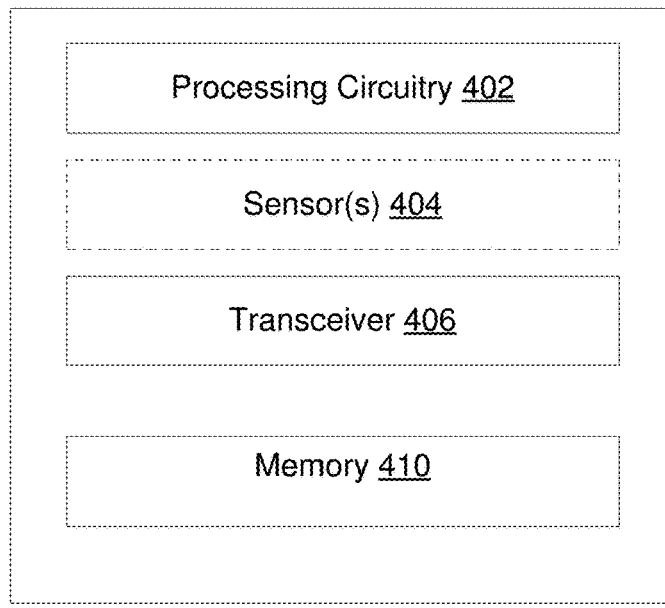
FIG. 4 illustrates a block diagram of an exemplary computing device (controller) in accordance with the disclosure.

FIG. 4 illustrates a block diagram of an exemplary computing device 400, in accordance with the disclosure. The computing device 400 as shown and described with respect to FIG. 4 may be identified with the computing device 108 and/or server 110 as shown in FIG. 1 and discussed herein, for instance. The computing device 400 may include processing circuitry 402, one or more sensors 404, a transceiver 406, and a memory 410. In some examples, the computer device 400 is configured to interact with one or more external sensors (e.g. sensor 120) as an alternative or in addition to including internal sensors 404. The components shown in FIG. 4 are provided for ease of explanation, and the computing device 400 may implement additional, less, or alternative components as those shown in FIG. 4.

The processing circuitry 402 may be configured as any suitable number and/or type of computer processors, which may function to control the computing device 400 and/or other components of the computing device 400. The processing circuitry 402 may be identified with one or more processors (or suitable portions thereof) implemented by the computing device 400.

The processing circuitry 402 may be configured to carry out instructions to perform arithmetical, logical, and/or input/output (I/O) operations, and/or to control the operation of one or more components of computing device 400 to perform various functions as described herein. For example, the processing circuitry 402 may include one or more microprocessor cores, memory registers, buffers, clocks, etc., and may generate electronic control signals associated with the components of the computing device 400 to control and/or modify the operation of these components. For example, the processing circuitry 402 may control functions associated with the sensors 404, the transceiver 406, and/or the memory 410.

The sensors 404 may be implemented as any suitable number and/or type of sensors that may be used for autonomous navigation and environmental monitoring. Examples of such sensors may include radar, LIDAR, optical sensors, cameras, compasses, gyroscopes, positioning systems for localization, accelerometers, etc. In some examples, the computing device 400 is additionally or alternatively configured to communicate with one or more external sensors similar to sensors 404 (e.g. sensor 120 in FIG. 1).

The transceiver 406 may be implemented as any suitable number and/or type of components configured to transmit and/or receive data packets and/or wireless signals in accordance with any suitable number and/or type of communication protocols. The transceiver 406 may include any suitable type of components to facilitate this functionality, including components associated with known transceiver, transmitter, and/or receiver operation, configurations, and implementations. Although depicted in FIG. 4 as a transceiver, the transceiver 406 may include any suitable number of transmitters, receivers, or combinations of these that may be integrated into a single transceiver or as multiple transceivers or transceiver modules. For example, the transceiver 406 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. The transceiver 406 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

The memory 410 stores data and/or instructions such that, when the instructions are executed by the processing circuitry 402, cause the computing device 400 to perform various functions as described herein. The memory 410 may be implemented as any well-known volatile and/or non-volatile memory. The memory 410 may be implemented as a non-transitory computer readable medium storing one or more executable instructions such as, for example, logic, algorithms, code, etc. The instructions, logic, code, etc., stored in the memory 410 are represented by the various modules as shown in FIG. 4, which may enable the features described herein to be functionally realized. For example, the memory 410 may include the ITS module 412 representing the ITS algorithm. The ITS algorithm may further include a sampler configured to perform the sampling operations and a path planner configured to perform the path planning operations. For hardware implementations, the modules shown in FIG. 4 associated with the memory 410 may include instructions and/or code to facilitate control and/or monitor the operation of such hardware components. In other words, the modules shown in FIG. 4 are provided for ease of explanation regarding the functional association between hardware and software components. Thus, the disclosure includes the processing circuitry 402 executing the instructions stored in these respective modules in conjunction with one or more hardware components to perform the various functions described herein.

SGR System and Operations

FIG. 5 illustrates a SGR system and operational flow according to the present disclosure. The SGR system may be configured to create a comprehensive environment model around the current position of the SGR 115 (environment monitoring 504). As described herein, any combination of the controller 108, server 110, SGRs 115 and AMRs 102 may be configured to generate and adapt the environmental model. The model may be adapted based on sensor and/or other data as described herein. The environment monitoring 504 by the SGR 115 may include monitoring position and/or motion of the human 116 and/or the position and/or motion of the AMRs 102 and/or other static and/or dynamic devices within the environment 100.

The environment model may be created and/or adapted based on the sensor data generated by one or more sensors 204 of the SGR 115, sensor data and/or other data (e.g. internal state information) from one or more of the AMRs 102 (robot communication 502), data from the controller 108, and/or other data as would be understood by one of ordinary skill in the art.

Based on this environment model, the SGR 115, controller 108, and/or server 110 assess and predict human behavior (Human Monitoring 506). Using the results from both the environment monitoring 504 and the human monitoring 506, the SGR 115, controller 108, and/or server 110 perform a safety assessment 508. The safety assessment 508 determines a safe path as described herein for the SGR 115 to travel and guide the human 116 as well as determines one or more AMRs 102 that should be controlled (e.g. instructed to stop or modify operations) along the path.

The SGR system also provides communication with the human 116 (Human Communication 510) to provide the human 116 with a guided path and/or other instructions.

As will be appreciated the computation tasks of the SGR system may be performed by any combination of the SGR 115, controller 108, server 110, and one or more AMRs 102. Sensor and/or other data from the SGRs 115 and/or AMRs 102 may be provided to the controller 108 and/or server 110, and vice versa. In configurations where computations are performed by the controller 108 and/or server 110, sensor and/or other data from the SGR 115 and/or AMRs 102 is provided to the controller 108 and/or server 110, and the controller 108 and/or server 100 perform path planning and generation and/or adaptation of the environment model, which is then provided to the SGRs 115 and/or AMRs 102. With the environment model, the SGR 115 communicates with the human 116 (e.g. guide path, audio and/or video assistance) to guide the human 116 along a safe path identified in the path planning processing.

Environment Monitoring 504

SGR system may be configured to create a comprehensive environment model around the current position of the SGR 115 (environment monitoring 504). FIG. 6 illustrates an environment model according to the disclosure. The environment model may be generated and/or adapted by the controller 108, server 110, SGRs 115 and AMRs 102 based on sensor and/or other data as described herein. For example, the environment model may be based on sensor data from one or more sensors 204 (e.g. radar, LIDAR, camera) of the SGR 115 and/or sensor data and/or other data (e.g. internal state information) from one or more of the AMRs 102. The SGR system (e.g. SGR 115) is configured to detect and/or classify objects in the environment 100 based on the sensor data, and/or to perform self-localization of the SGR 115 based on the sensor data (e.g. GPS, wireless communication geo-location, LIDAR, radar, etc.). The generated environment model may include the position and motion of all AMRs 102, the SGR 115, the human 116, and/or other static and dynamic objects within the environment. As illustrated in FIG. 6, the model includes locations of the AMRs 102 and determine paths through the environment 100.

Human Monitoring 506

The SGR system leverages the environment model to perform monitoring of the human(s) 116 within the environment 100. In performing human monitoring operations 506, the SGR system can predict the motion of the human 116 for a predetermined time period (e.g. serval seconds) into the future. Based the predicted movement of the human 116, the SGR system is configured to plan and optimize the path of the SGR 115. The planned path may additionally be based on the predetermined path provided to the system and/or determined from a provided task to be performed by the human 116. The SGR 115 may then use the planned path to operate in a guiding mode to guide the human 116 safely within the environment 100. As is shown in FIGS. 5 and 7, the SGR 115 is configured to highlight or otherwise convey unsafe areas within the environment 100 to the human 116. For example, the SGR 115 may provide audio/visual messages to the human 116 (via I/O interface 208) and/or a projected path indicator (e.g. laser projected markers onto the floor of the environment.

The conveyance of information to the human 116 improves as the SGR 115 improves in location relative to the movement of the human 116. Therefore, the SGR 115 is configured to adapt its movement based on predictions of the movements of the human 116. According to the disclosure, the SGR 115 may be configured to compare the current location and motion of the human 116 to the originally planned path (e.g. from entrance to the working location). If the SGR 115 and/or other components (e.g. controller 108 and/or server 110) detects a deviation from the original planned path (e.g. because the human 116 ignores guidance and/or commands from the SGR 115), the SGR 115 may being to operate in a tracking (following) mode. In the tracking mode, the SGR tracks and follows the human 116 as the human 116 moves through the environment to ensure safety of the human 116. For example, the SGR 115 and/or other components (e.g. controller 108 and/or server 110) may adaptively indicate safe path information to the human 116 and/or slow down or shutdown AMRs 102 the SGR 115 predicts may be encountered by the human 116 while deviating from the original path. The SGR 115 and/or other components (e.g. controller 108 and/or server 110) may determine the new path that will be taken by the human 116 during a deviation by predicting future movements of the human 116. According to the disclosure, when the SGR 115 and/or other components (e.g. controller 108 and/or server 110) detect that the human 116 is deviating from the original planned path, the SGR 115 may position itself so as to block the human 116 from moving in a particular direction to force or encourage the human 116 back onto the originally planned path. In this example, the SGR 115 may additionally or alternative warn the human 116 that they are deviating from the planned path via the I/O interface 208 (e.g. audio or visional warning). The SGR may additionally or alternatively restrain and/or contain the human 116 so as to prevent the human 116 from making an undesired movement.

According to the disclosure, the SGR system may detect possible anomalies/deviations associated with human 116 in addition or as an alternative to deviations from the originally planned path. For example, the SGR system may detect that the human 116 is performing a different, unplanned task, and/or is accessing restricted information and/or locations (e.g. reading terminal screens that should not be read, accessing restricted machinery, etc.).

In detecting anomalies in the human activity, the SGR 115 may be configured to perform behavior anomaly detection operations. The anomaly detection may include determining a behavior certainty score (k) reflecting a degree of certainty the SGR system assigns to the behavior of the human 115 within the environment 100 based on the original planned behavior (e.g. predicted behavior based on planned task, etc.). In this example, a score of 100 corresponds to perfect/complete fulfillment, while a score of 0 corresponds to situations where evidence suggests that the human behavior is no longer in alignment to the planned behavior. The behavior certainty score may be determined based on the following equation:

$$\kappa = \Delta(\text{Planned Action, Monitored Action}) \in [0,100]$$

Safety Assessment 508

Using the environment model as well as the predicted path(s) for the human 116, the SGR system may perform a safety assessment to evaluate the risk associated with each AMR 102 (and/or other objects) within the environment 100. According to the disclosure, the SGR 115 and/or other components (e.g. controller 108 and/or server 110) are configured to determine a collision probability (as a function of distance between the human 116 and the AMRs 102 and the certainty score), the exposure/duration in which the human 116 would be within a dangerous or potentially hazardous distance to the AMR(s) 102 (e.g. determining if the human 116 is within a hazardous distance threshold to the AMR(s) 102), and the potential severity of harm. According to the disclosure, the risk estimation may be performed for several operating modes of one or more AMRs 102, including, for example, standing (shut down) operation, reduced speed operation, and normal operating speed. In this example, the SGR system may determine which of the AMRs 102 can continue or resume operating at normal operational parameters (e.g. normal speed) due to low risk, which robots should operate at a reduced speed, and which robots should be stopped (shut down completely). The SGR 115 and/or other components (e.g. controller 108 and/or server 110) may send this semantic information as control commands to the appropriate AMRs 102 to control the AMRs 102 accordingly. According to the disclosure, the environment model may be updated with the information on safe/unsafe regions as depicted in FIG. 7 and the SGR 115 may provide corresponding notifications to the human 116 (e.g. audio and/or visual notifications and warnings) during the Human Communication 510 processing.

According to the disclosure, the SGR 115 and/or other components (e.g. controller 108 and/or server 110) may generate control commands for the SGR 115 based on the path to the desired location within the environment 100, the predicted motion of the human 116, the certainty score, the environment model, and/or the information on the safe/unsafe regions in the environment 100. Further, based on the operating mode of the SGR 115 (e.g. guide mode vs. tracking mode), the SGR 115 and/or other components (e.g. controller 108 and/or server 110) may generate different commands for the same environment model and robot constellations. For example, if the human 116 does not follow the originally planned path, and the SGR 115 operates in the tracking mode, the control commands may cause the SGR 115 to move/cut off the human 115 to redirect the human 115 back to the originally planned path. Similarly, if the certainty score is high and the SGR 115 is operating in the guiding mode, the velocity of the SGR 115 may be reduced to cause the human 115 to traverse the environment 100 at a corresponding slower speed.

A further advantage of the SGR system according to the disclosure is that the SGR system may leverage its knowledge of the tasks of the various AMRs 102 to adjust the movement of the human 116 within the environment 100. For example, because the SGR 115 is aware of the tasks performed by the AMRs 102, the SGR 115 may slow down its movement to cause the human 116 to reduce their speed as the human 116 and SGR 115 approach a particular AMR 102 that may be currently performing a task that will be completed in a short period of time. The reduction in the speed of the SGR 115 will provide the additional time for the AMR 102 to complete its task (thereby rendering the AMR 102 safe for the human 116 to approach) instead of having to slow or halt the operation of the AMR 102 to provide safe passage by the human 116. That is, the omniscient nature of the system provides that the system has knowledge of AMR tasks, SGR position and planned movement, human position and predicted movement, the planned path, and planned human task, such that the system is configured to determine the optimal and best economical path and task schedule.

Human Communication 510

The human communication 510 operations provide for the SGR 115 to communicate with the human 116. In operation, the SGR 115 is configured to provide audio and visual communications (e.g. warnings, directions), such as audible warning, warning displayed on a display of the SGR 115, laser generated pointers or guides projected on the ground, light projected onto regions of the floor, and/or projected warning signals into the air, to make the human 115 aware of safe and unsafe areas (e.g. green vs. red areas in FIG. 7). Moreover, the SGR 115 can highlight the path to the desired destination using these interfaces 208. Audio communications may include audio messages to request, for example, that the human 116 walk slower, turn left or right, or the like. Furthermore, if a deviation from the originally planned path is detected, a warning message (e.g. audio and/or visual) can be generated, as well as visual warning signals displayed on a display screen to the human 116.

According to the disclosure, the SGR may additionally be configured to provide first-level support given the knowledge of the anticipated task to be performed by the human 116. For example, the SGR 115 may provide support on-site, such as providing an initial check of the situation and/or even use attempting to fix an issue using a manipulator arm of the SGR 115.

According to the disclosure, the SGR 115 may additionally or alternatively be configured to inspect the environment 102 (e.g. using one or more of its sensors 204) to predict required maintenance. For example, the SGR 115 could traverse the environment 100 to monitor behavior of the AMRs 102 to observe the motion and actions of the AMRs 102 to detect possible anomalies. Such inspection operations may be requested based on analysis of detected behavior by, for example the controller and/or server 110 of the AMRs 102, performed periodically, and/or performed while the SGR 115 is performing guidance operations through the environment 100 with a human 116.

EXAMPLES

The following examples pertain to various techniques of the present disclosure.

An example (e.g. example 1) relates to a controller for an autonomous agent, comprising: a communication interface configured to receive sensor data; and a processor configured to: determine, based on sensor data: a position of the autonomous agent, a position of a human being guided by the autonomous agent in an environment, and operational information of one or more other autonomous agents; and control a movement of the autonomous agent based on the determined position of the autonomous agent, the determined position of the human being guided by the autonomous agent, and the operational information of one or more other autonomous agents.

Another example (e.g. example 2) relates to a previously-described example (e.g. example 1), wherein the processor is further configured to generate a notification for the human to notify the human of a desired path, the notification being generated based on the determined position of the autonomous agent, the determined position of the human being guided by the autonomous agent, and the operational information of one or more other autonomous agents.

Another example (e.g. example 3) relates to a previously-described example (e.g. one or more of examples 1-2), wherein the processor is further configured to control the one or more other autonomous agents to adjust an operation of the one or more other autonomous agents based on the determined position of the autonomous agent, the determined position of the human being guided by the autonomous agent, and the operational information of one or more other autonomous agents.

Another example (e.g. example 4) relates to a previously-described example (e.g. one or more of examples 1-3), wherein the processor is further configured to predict a future movement of the human based on the determined position of the human being guided by the autonomous agent.

Another example (e.g. example 5) relates to a previously-described example (e.g. example 4), wherein the processor is configured to predict the future movement of the human based on the determined position of the human being guided by the autonomous agent and a current movement of the human.

Another example (e.g. example 6) relates to a previously-described example (e.g. example 5), wherein the processor is configured to predict the future movement of the human further based on a planned path of the autonomous agent through the environment.

Another example (e.g. example 7) relates to a previously-described example (e.g. one or more of examples 1-6), wherein the processor is configured to: determine a behavior certainty score based on a current movement of the human and a planned path of the autonomous agent through the environment; and predict a future movement of the human based on the behavior certainty score.

Another example (e.g. example 8) relates to a previously-described example (e.g. one or more of examples 1-7), wherein: the processor is configured to estimate a risk of harm to the human based on a collision probability of the one or more other autonomous agents with the human; the collision probability is determined based on a distance of the human to the one or more other autonomous agents and a behavior certainty score; and the behavior certainty score is determined based on a current movement of the human and a planned path of the autonomous agent through the environment.

Another example (e.g. example 9) relates to a previously-described example (e.g. example 8), wherein the processor is configured to further estimate the risk of harm based on: a duration in which a distance of the human to the one or more other autonomous agents is less than a hazardous distance threshold, or an estimated severity of harm to the human causable by the one or more other autonomous agents.

Another example (e.g. example 10) relates to a previously-described example (e.g. one or more of examples 8-9), wherein the processor is further configured to control the one or more other autonomous agents, based on the estimated risk, to adjust an operation of the one or more other autonomous agents.

Another example (e.g. example 11) relates to a previously-described example (e.g. one or more of examples 1-10), wherein the processor is further configured to adapt a planned path of the autonomous agent through the environment based on the determined position of the autonomous agent, the determined position of the human being guided by the autonomous agent, and the operational information of one or more other autonomous agents.

Another example (e.g. example 12) relates to a previously-described example (e.g. example 11), wherein the processor is configured to adapt the planned path further based on a predicted movement of the human.

Another example (e.g. example 13) relates to a previously-described example (e.g. one or more of examples 1-12), further comprising one or more sensors configured to generate at least a portion of the sensor data.

Another example (e.g. example 14) relates to a previously-described example (e.g. one or more of examples 1-13), wherein at least a portion of the sensor data is received from the one or more other autonomous agents.

Another example (e.g. example 15) relates to a previously-described example (e.g. one or more of examples 1-14), wherein at least another portion of the sensor data is received from an external controller configured to control the one or more other autonomous agents.

Another example (e.g. example 16) relates to a previously-described example (e.g. one or more of examples 1-15), wherein the autonomous agent is a safety guide robot (SGR) configured to guide the human within the environment.

Another example (e.g. example 17) relates to a safety guide robot (SGR) comprising: one or more sensors configured to detect a position of the SGR and a movement of a human being guided by the SGR in an environment, and to generate sensor data based on the detected position and movement; a transceiver configured to receive operational information from one or more other autonomous agents within the environment; and a processor configured to control the SGR based on the sensor data and the received operational information.

Another example (e.g. example 18) relates to a previously-described example (e.g. example 17), further comprising an interface configured to receive an input from the human and to provide a notification to the human, wherein the processor is further configured to generate the notification for the human to notify the human of a desired path, the notification being generated based on the sensor data and the received operational information.

Another example (e.g. example 19) relates to a previously-described example (e.g. example 18), wherein the interface comprises an interfacing device selected from the group consisting of: one or more speakers, one or more microphones, a touchscreen display, and a laser pointer.

Another example (e.g. example 20) relates to a previously-described example (e.g. one or more of examples 17-19), wherein the processor is further configured to control the one or more other autonomous agents to adjust an operation of the one or more other autonomous agents based on the sensor data and received operational information of one or more other autonomous agents.

Another example (e.g. example 21) relates to a previously-described example (e.g. one or more of examples 17-20), wherein the processor is further configured to predict a future movement of the human based on the sensor data and a planned path of the SGR through the environment.

Another example (e.g. example 22) relates to a previously-described example (e.g. one or more of examples 17-21), wherein the processor is further configured to adapt a planned path of the SGR through the environment based on the sensor data, the operational information of one or more other autonomous agents, and a predicted future movement of the human.

Another example (e.g. example 23) relates to a previously-described example (e.g. one or more of examples 17-22), wherein the transceiver is configured to receive data from an external controller configured to control the one or more other autonomous agents, the processor being configured to control the SGR based on the sensor data, the received operational information from the one or more autonomous agents, and the data from the external controller.

Another example (e.g. example 24) relates to a previously-described example (e.g. one or more of examples 17-23), wherein the processor is configured to assess a safeness for the human of the environment based on the sensor data and the received operational information, the control of the SGR being based on the assessed safeness of the environment.

An example (e.g. example 25) relates to a controller for an autonomous agent, comprising: an interface means for receiving sensor data; and processing means for: determining, based on sensor data: a position of the autonomous agent, a position of a human being guided by the autonomous agent in an environment, and operational information of one or more other autonomous agents; and controlling a movement of the autonomous agent based on the determined position of the autonomous agent, the determined position of the human being guided by the autonomous agent, and the operational information of one or more other autonomous agents.

Another example (e.g. example 26) relates to a previously-described example (e.g. example 25), wherein the processing means is further configured to generate a notification for the human to notify the human of a desired path, the notification being generated based on the determined position of the autonomous agent, the determined position of the human being guided by the autonomous agent, and the operational information of one or more other autonomous agents.

Another example (e.g. example 27) relates to a previously-described example (e.g. one or more of examples 25-26), wherein the processing means is further configured to control the one or more other autonomous agents to adjust an operation of the one or more other autonomous agents based on the determined position of the autonomous agent, the determined position of the human being guided by the autonomous agent, and the operational information of one or more other autonomous agents.

Another example (e.g. example 28) relates to a previously-described example (e.g. one or more of examples 25-27), wherein the processing means is further configured to predict a future movement of the human based on the determined position of the human being guided by the autonomous agent.

Another example (e.g. example 29) relates to a previously-described example (e.g. example 28), wherein the processing means is configured to predict the future movement of the human based on the determined position of the human being guided by the autonomous agent and a current movement of the human.

Another example (e.g. example 30) relates to a previously-described example (e.g. example 29), wherein the processing means is configured to predict the future movement of the human further based on a planned path of the autonomous agent through the environment.

Another example (e.g. example 31) relates to a previously-described example (e.g. one or more of examples 25-30), wherein the processing means is configured to: determine a behavior certainty score based on a current movement of the human and a planned path of the autonomous agent through the environment; and predict a future movement of the human based on the behavior certainty score.

Another example (e.g. example 32) relates to a previously-described example (e.g. one or more of examples 25-31), wherein: the processing means is configured to estimate a risk of harm to the human based on a collision probability of the one or more other autonomous agents with the human; the collision probability is determined based on a distance of the human to the one or more other autonomous agents and a behavior certainty score; and the behavior certainty score is determined based on a current movement of the human and a planned path of the autonomous agent through the environment.

Another example (e.g. example 33) relates to a previously-described example (e.g. example 32), wherein the processing means is configured to further estimate the risk of harm based on: a duration in which a distance of the human to the one or more other autonomous agents is less than a hazardous distance threshold, or an estimated severity of harm to the human causable by the one or more other autonomous agents.

Another example (e.g. example 34) relates to a previously-described example (e.g. one or more of examples 32-33), wherein the processing means is further configured to control the one or more other autonomous agents, based on the estimated risk, to adjust an operation of the one or more other autonomous agents.

Another example (e.g. example 35) relates to a previously-described example (e.g. one or more of examples 25-34), wherein the processing means is further configured to adapt a planned path of the autonomous agent through the environment based on the determined position of the autonomous agent, the determined position of the human being guided by the autonomous agent, and the operational information of one or more other autonomous agents.

Another example (e.g. example 36) relates to a previously-described example (e.g. example 35), wherein the processing means is configured to adapt the planned path further based on a predicted movement of the human.

Another example (e.g. example 37) relates to a previously-described example (e.g. one or more of examples 25-36), further comprising one or more sensing means for generating at least a portion of the sensor data.

Another example (e.g. example 38) relates to a previously-described example (e.g. one or more of examples 25-37), wherein at least a portion of the sensor data is received from the one or more other autonomous agents.

Another example (e.g. example 39) relates to a previously-described example (e.g. one or more of examples 25-38), wherein at least another portion of the sensor data is received from an external controlling means for controlling the one or more other autonomous agents.

Another example (e.g. example 40) relates to a previously-described example (e.g. one or more of examples 25-39), wherein the autonomous agent is a safety guide robot (SGR) configured to guide the human within the environment.

Another example (e.g. example 41) relates to a safety guide robot (SGR) comprising: sensing means for detecting a position of the SGR and a movement of a human being guided by the SGR in an environment, and for generating sensor data based on the detected position and movement; transceiving means for receiving operational information from one or more other autonomous agents within the environment; and processing means for controlling the SGR based on the sensor data and the received operational information.

Another example (e.g. example 42) relates to a previously-described example (e.g. example 41), further comprising interface means for receiving an input from the human and for providing a notification to the human, wherein the processing means is further configured to generate the notification for the human to notify the human of a desired path, the notification being generated based on the sensor data and the received operational information.

Another example (e.g. example 43) relates to a previously-described example (e.g. example 42), wherein the interface means comprises one or more speakers, one or more microphones, a touchscreen display, and/or a laser pointer.

Another example (e.g. example 44) relates to a previously-described example (e.g. one or more of examples 41-43), wherein the processing means is further configured to control the one or more other autonomous agents to adjust an operation of the one or more other autonomous agents based on the sensor data and received operational information of one or more other autonomous agents.

Another example (e.g. example 45) relates to a previously-described example (e.g. one or more of examples 41-44), wherein the processing means is further configured to predict a future movement of the human based on the sensor data and a planned path of the SGR through the environment.

Another example (e.g. example 46) relates to a previously-described example (e.g. one or more of examples 41-45), wherein the processing means is further configured to adapt a planned path of the SGR through the environment based on the sensor data, the operational information of one or more other autonomous agents, and a predicted future movement of the human.

Another example (e.g. example 47) relates to a previously-described example (e.g. one or more of examples 41-46), wherein the transceiving means is configured to receive data from external controlling means for controlling the one or more other autonomous agents, the processing means being configured to control the SGR based on the sensor data, the received operational information from the one or more autonomous agents, and the data from the external controlling means.

Another example (e.g. example 48) relates to a previously-described example (e.g. one or more of examples 41-47), wherein the processing means is configured to assess a safeness for the human of the environment based on the sensor data and the received operational information, the control of the SGR being based on the assessed safeness of the environment.

An example is related to an autonomous agent that includes the controller of a previously-described example (e.g. one or more of examples 1-16 and/or 27-40).

An example is related to an autonomous mobile robot that includes the controller of a previously-described example (e.g. one or more of examples 1-16 and/or 27-40).

An example is related to a computing system that includes the controller of a previously-described example (e.g. one or more of examples 1-16 and/or 27-40).

An example is related to a system that includes one or more autonomous agents and a computing system, the one or more autonomous agents and the computing system each including the controller of a previously-described example (e.g. one or more of examples 1-16 and/or 27-40).

An apparatus as shown and described.

A method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor," "processing circuitry," or "controller" as used herein may be understood as any kind of technological entity that allows handling of data. The data may be handled according to one or more specific functions executed by the processor, processing circuitry, or controller. Further, processing circuitry, a processor, or a controller as used herein may be understood as any kind of circuit, e.g., any kind of analog or digital circuit. Processing circuitry, a processor, or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as processing circuitry, a processor, controller, or logic circuit. It is understood that any two (or more) of the processors, controllers, logic circuits, or processing circuitries detailed herein may be realized as a single entity with equivalent functionality or the like, and conversely that any single processor, controller, logic circuit, or processing circuitry detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). Processing circuitry, a processor, or a controller may transmit or receive data over a software-level connection with another processor, controller, or processing circuitry in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

An "agent" may be understood to include any type of driven object. An agent may be a driven object with a combustion engine, a reaction engine, an electrically driven object, a hybrid driven object, or a combination thereof. An agent may be or may include a moving robot, a personal transporter, a drone, and the like.

The term "autonomous agent" may describe an agent that implements all or substantially all navigational changes, at least during some (significant) part (spatial or temporal, e.g., in certain areas, or when ambient conditions are fair, or on highways, or above or below a certain speed) of some drives. Sometimes an "autonomous agent" is distinguished from a "partially autonomous agent" or a "semi-autonomous agent" to indicate that the agent is capable of implementing some (but not all) navigational changes, possibly at certain times, under certain conditions, or in certain areas. A navigational change may describe or include a change in one or more of steering, braking, or acceleration/deceleration of the agent. An agent may be described as autonomous even in case the agent is not fully automatic (fully operational with driver or without driver input). Autonomous agents may include those agents that can operate under driver control during certain time periods and without driver control during other time periods. Autonomous agents may also include agents that control only some implementations of agent navigation, such as steering (e.g., to maintain an agent course between agent lane constraints) or some steering operations under certain circumstances (but not under all circumstances), but may leave other implementations of agent navigation to the driver (e.g., braking or braking under certain circumstances). Autonomous agents may also include agents that share the control of one or more implementations of agent navigation under certain circumstances (e.g., hands-on, such as responsive to a driver input) and agents that control one or more implementations of agent navigation under certain circumstances (e.g., hands-off, such as independent of driver input). Autonomous agents may also include agents that control one or more implementations of agent navigation under certain circumstances, such as under certain environmental conditions (e.g., spatial areas, roadway conditions). In some implementations, autonomous agents may handle some or all implementations of braking, speed control, velocity control, and/or steering of the agent. An autonomous agent may include those agents that can operate without a driver. The level of autonomy of an agent may be described or determined by the Society of Automotive Engineers (SAE) level of the agent (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The systems and methods of the disclosure may utilize one or more machine learning models to perform corresponding functions of the agent (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. According to the disclosure, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The systems and methods of the disclosure may utilize one or more classification models. In a classification model, the outputs may be restricted to a limited set of values (e.g., one or more classes). The classification model may output a class for an input set of one or more input values. An input set may include road condition data, event data, sensor data, such as image data, radar data, LIDAR data and the like, and/or other data as would be understood by one of ordinary skill in the art. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

One or more regression models may be used. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing an agent to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The invention claimed is:

1. A controller for an autonomous agent, comprising:
a communication interface configured to receive sensor data; and
a processor configured to:
  determine, based on the sensor data: a position of the autonomous agent, a position of a human being guided by the autonomous agent in an environment, and operational information of one or more other autonomous agents;
  estimate a risk of harm to the human based on;
    a collision probability of the one or more other autonomous agents with the human, the collision probability being determined based on a distance of the human to the one or more other autonomous agents and a behavior certainty score, wherein the behavior certainty score is determined based on a current movement of the human and a planned path of the autonomous agent through the environment, and
    a duration in which the distance of the human to the one or more other autonomous agents is less than a distance threshold; and
  control a movement of the autonomous agent based on the determined position of the autonomous agent, the determined position of the human being guided by the autonomous agent, the operational information of one or more other autonomous agents, and the estimated risk of harm to the human.

2. The controller of claim 1, wherein the processor is further configured to generate a notification for the human to notify the human of a desired path, the notification being generated based on the determined position of the autonomous agent, the determined position of the human being guided by the autonomous agent, and the operational information of one or more other autonomous agents.

3. The controller of claim 1, wherein the processor is further configured to control the one or more other autonomous agents to adjust an operation of the one or more other autonomous agents based on the determined position of the autonomous agent, the determined position of the human being guided by the autonomous agent, and the operational information of one or more other autonomous agents.

4. The controller of claim 1, wherein the processor is further configured to predict a future movement of the human based on the determined position of the human being guided by the autonomous agent.

5. The controller of claim 4, wherein the processor is configured to predict the future movement of the human based on the determined position of the human being guided by the autonomous agent and a current movement of the human.

6. The controller of claim 5, wherein the processor is configured to predict the future movement of the human further based on the planned path of the autonomous agent through the environment.

7. The controller of claim 1, wherein the processor is configured to predict a future movement of the human based on the behavior certainty score.

8. The controller of claim 1, wherein the processor is configured to further estimate the risk of harm further based on an estimated severity of harm to the human causable by the one or more other autonomous agents.

9. The controller of claim 1, wherein the processor is further configured to control the one or more other autonomous agents, based on the estimated risk, to adjust an operation of the one or more other autonomous agents.

10. The controller of claim 1, wherein the processor is further configured to adapt a planned path of the autonomous agent through the environment based on the determined position of the autonomous agent, the determined position of the human being guided by the autonomous agent, the operational information of one or more other autonomous agents, and the estimated risk of harm to the human.

11. The controller of claim 10, wherein the processor is configured to adapt the planned path further based on a predicted movement of the human.

12. The controller of claim 1, further comprising one or more sensors configured to generate at least a portion of the sensor data.

13. The controller of claim 1, wherein at least a portion of the sensor data is received from the one or more other autonomous agents.

14. The controller of claim 13, wherein at least another portion of the sensor data is received from an external controller configured to control the one or more other autonomous agents.

15. The controller of claim 1, wherein the autonomous agent is a safety guide robot (SGR) configured to guide the human within the environment.

16. A safety guide robot (SGR) comprising:
one or more sensors configured to detect a position of the SGR and a movement of a human being guided by the SGR in an environment, and to generate sensor data based on the detected position and movement;
a transceiver configured to receive operational information from one or more other autonomous agents within the environment; and
a processor configured to:
determine a collision probability of one or more other autonomous agents with the human based on a behavior certainty score and a distance of the human to the one or more other autonomous agents, wherein the behavior certainty score is determined based on the sensor data and a planned path of the SGR through the environment;
estimate a risk of harm to the human based on the collision probability and a duration in which the distance of the human to the one or more other autonomous agents is less than a distance threshold; and
control the SGR based on the sensor data, the received operational information, and the estimated risk of harm to the human.

17. The SGR of claim 16, further comprising an interface configured to receive an input from the human and to provide a notification to the human, wherein the processor is further configured to generate the notification for the human to notify the human of a desired path, the notification being generated based on the sensor data and the received operational information.

18. The SGR of claim 17, wherein the interface comprises an interfacing device selected from the group consisting of: one or more speakers, one or more microphones, a touchscreen display, and a laser pointer.

19. The SGR of claim 16, wherein the processor is further configured to control the one or more other autonomous agents to adjust an operation of the one or more other autonomous agents based on the sensor data and received operational information of one or more other autonomous agents.

20. The SGR of claim 16, wherein the processor is further configured to predict a future movement of the human based on the sensor data and a planned path of the SGR through the environment.

21. The SGR of claim 16, wherein the processor is further configured to adapt a planned path of the SGR through the environment based on the sensor data, the operational information of one or more other autonomous agents, and a predicted future movement of the human.

22. The SGR of claim 16, wherein the transceiver is configured to receive data from an external controller configured to control the one or more other autonomous agents, the processor being configured to control the SGR based on the sensor data, the received operational information from the one or more autonomous agents, and the data from the external controller.

* * * * *